United States Patent
Namgung

(10) Patent No.: US 11,970,150 B2
(45) Date of Patent: Apr. 30, 2024

(54) ELECTRONIC PARKING BRAKE SYSTEM AND CONTROL METHOD THEREFOR

(71) Applicant: HL MANDO CORPORATION, Pyeongtaek-si (KR)

(72) Inventor: Jin Namgung, Seoul (KR)

(73) Assignee: HL MANDO CORPORATION, Pyeongtaek-Si (KR)

( * ) Notice: Subject to any disclaimer, the term of this patent is extended or adjusted under 35 U.S.C. 154(b) by 0 days.

(21) Appl. No.: 17/784,359

(22) PCT Filed: Dec. 2, 2020

(86) PCT No.: PCT/KR2020/017482
§ 371 (c)(1),
(2) Date: Jun. 10, 2022

(87) PCT Pub. No.: WO2021/118154
PCT Pub. Date: Jun. 17, 2021

(65) Prior Publication Data
US 2023/0051728 A1    Feb. 16, 2023

(30) Foreign Application Priority Data

Dec. 12, 2019   (KR) .................. 10-2019-0166134

(51) Int. Cl.
*B60T 8/18*     (2006.01)
*B60T 8/172*    (2006.01)
(Continued)

(52) U.S. Cl.
CPC .............. *B60T 8/18* (2013.01); *B60T 8/1725* (2013.01); *B60T 8/1766* (2013.01); *B60T 8/58* (2013.01);
(Continued)

(58) Field of Classification Search
CPC ........ B60T 8/1725; B60T 8/1766; B60T 8/18; B60T 8/58; B60T 7/122; B60T 13/74;
(Continued)

(56) References Cited

U.S. PATENT DOCUMENTS

2013/0332043 A1    12/2013  Svensson et al.
2018/0208170 A1*    7/2018  Hanzawa ................ F16D 65/18
(Continued)

FOREIGN PATENT DOCUMENTS

CN        110271555 A      9/2019
GB         2535773 A  *    8/2016  ......... B60C 23/0486
(Continued)

OTHER PUBLICATIONS

English machined translation of JP-2007-015602 A (Jan. 25, 2007).*
(Continued)

*Primary Examiner* — Robert A. Siconolfi
*Assistant Examiner* — San M Aung
(74) *Attorney, Agent, or Firm* — LEE, HONG, DEGERMAN, KANG & WAIMEY

(57) ABSTRACT

An electronic parking brake system including: an electronic parking brake provided to generate a clamping force on a wheel of a vehicle; and a controller configured to estimate a weight of the vehicle based on a wheel pressure and a longitudinal acceleration of the vehicle at a time of service braking during driving, determine a clamping force required for parking based on the estimated weight of the vehicle during a parking operation, and operate the electronic parking brake to generate the determined clamping force.

15 Claims, 9 Drawing Sheets

(51) Int. Cl.
  *B60T 8/1766* (2006.01)
  *B60T 8/58* (2006.01)
  *B60T 13/74* (2006.01)
  *B60W 10/18* (2012.01)
  *B60W 40/13* (2012.01)

(52) U.S. Cl.
  CPC ............ *B60T 13/74* (2013.01); *B60W 10/182* (2013.01); *B60W 40/13* (2013.01); *B60Y 2400/3084* (2013.01); *B60Y 2400/81* (2013.01)

(58) Field of Classification Search
  CPC ...... B60T 13/741; B60T 13/586; B60T 17/22; B60T 2220/04; B60T 2240/03; B60W 10/18; B60W 10/182; B60W 40/13; B60Y 2400/81
  USPC ........................................................ 303/22.8
  See application file for complete search history.

(56) References Cited

U.S. PATENT DOCUMENTS

2020/0032902 A1\* 1/2020 Neelakantan ........... F16H 63/48
2020/0262399 A1\* 8/2020 Yokoyama ................ B60T 8/00

FOREIGN PATENT DOCUMENTS

| | | | |
|---|---|---|---|
| JP | 2007-015602 A | 1/2007 | |
| JP | 2016-133375 A | 7/2016 | |
| JP | 2017-159782 A | 9/2017 | |
| WO | WO-2017022584 A1 \* | 2/2017 | ............. B60T 13/74 |

OTHER PUBLICATIONS

International Search Report (PCT/ISA/210) issued in PCT Application No. PCT/KR2020/017482 dated Mar. 15, 2021 with English Translation.
Written Opinion (PCT/ISA/237) issued in PCT Application No. PCT/KR2020/017482 dated Mar. 15, 2021.

\* cited by examiner

[FIG. 1]
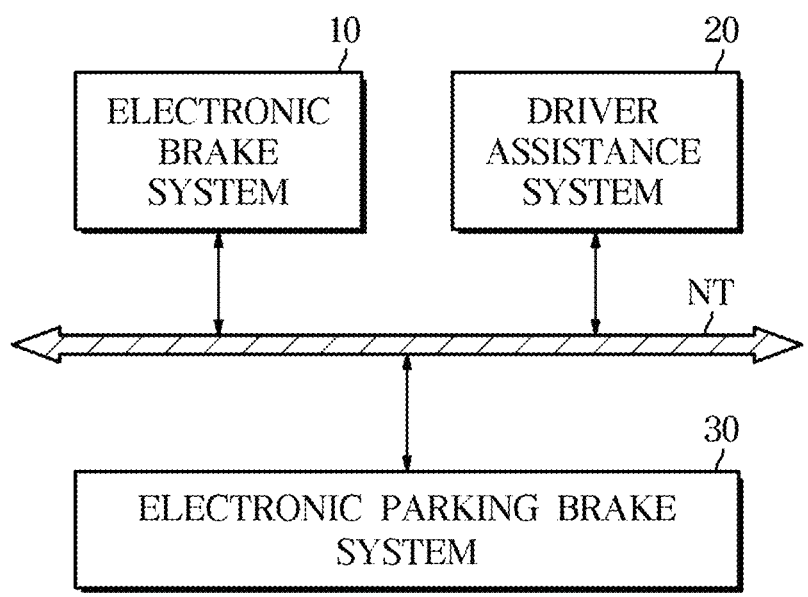

[FIG. 2]
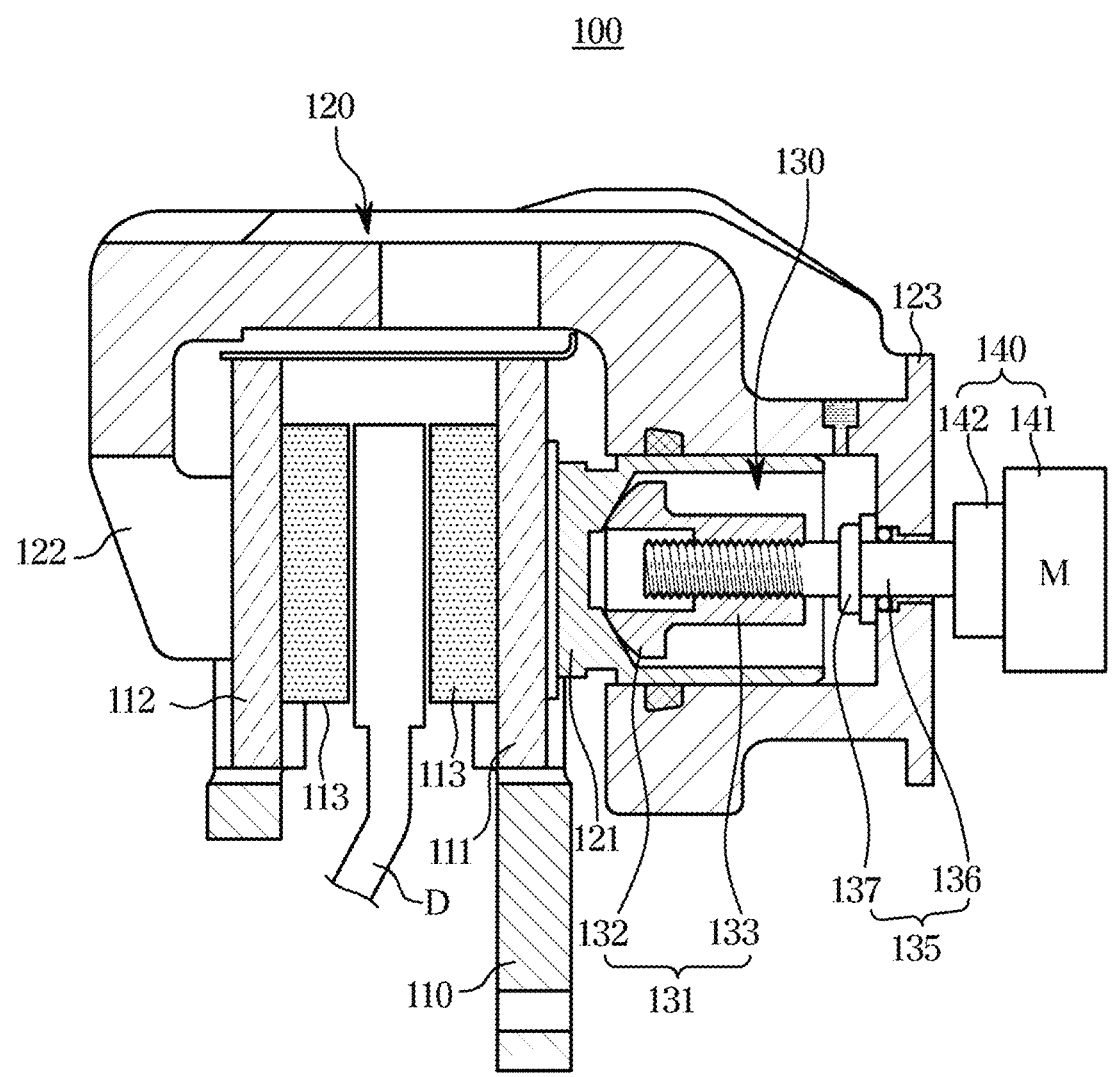

[FIG. 3]
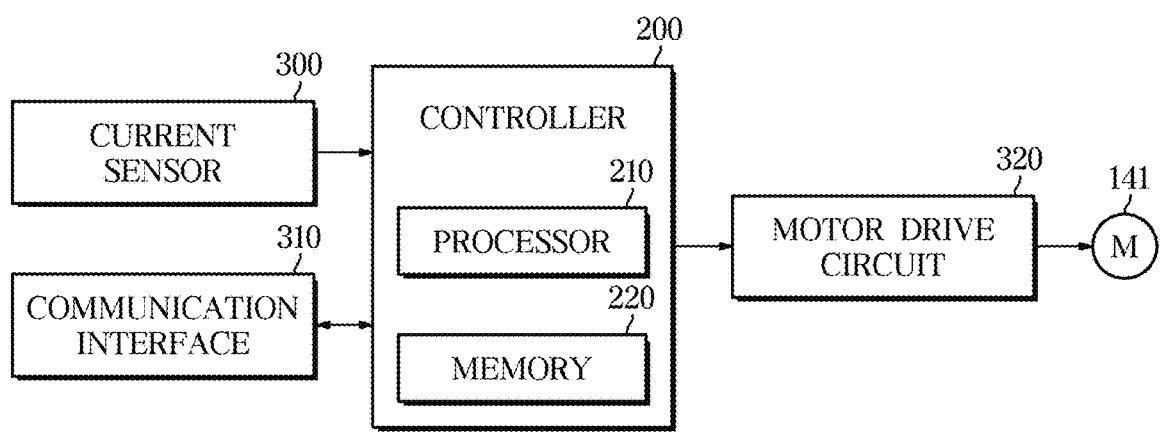

[FIG. 4]
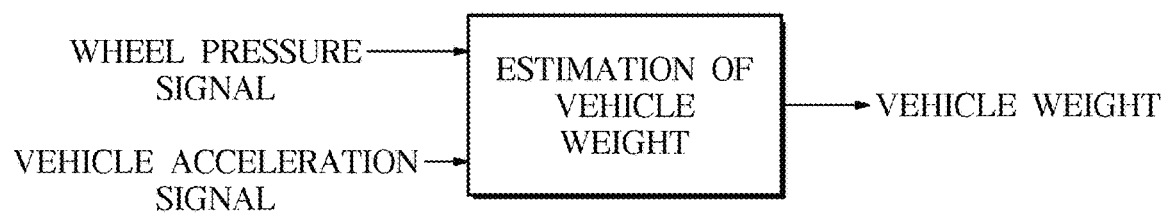

[FIG. 5]
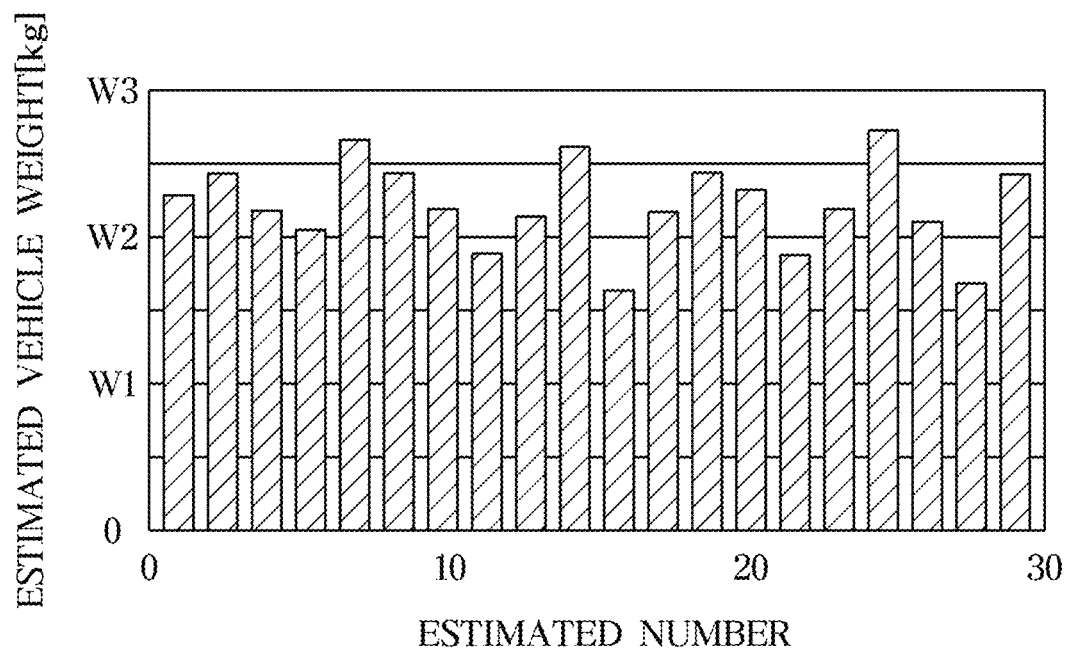

[FIG. 6]
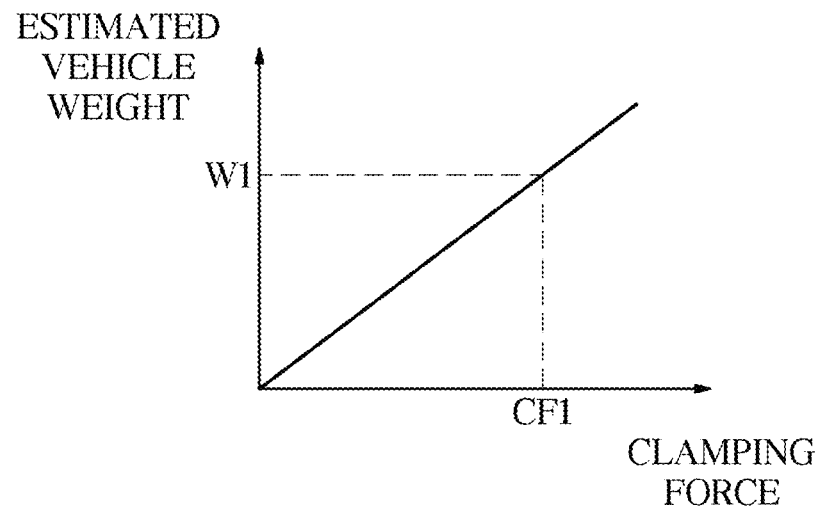

[FIG. 7]
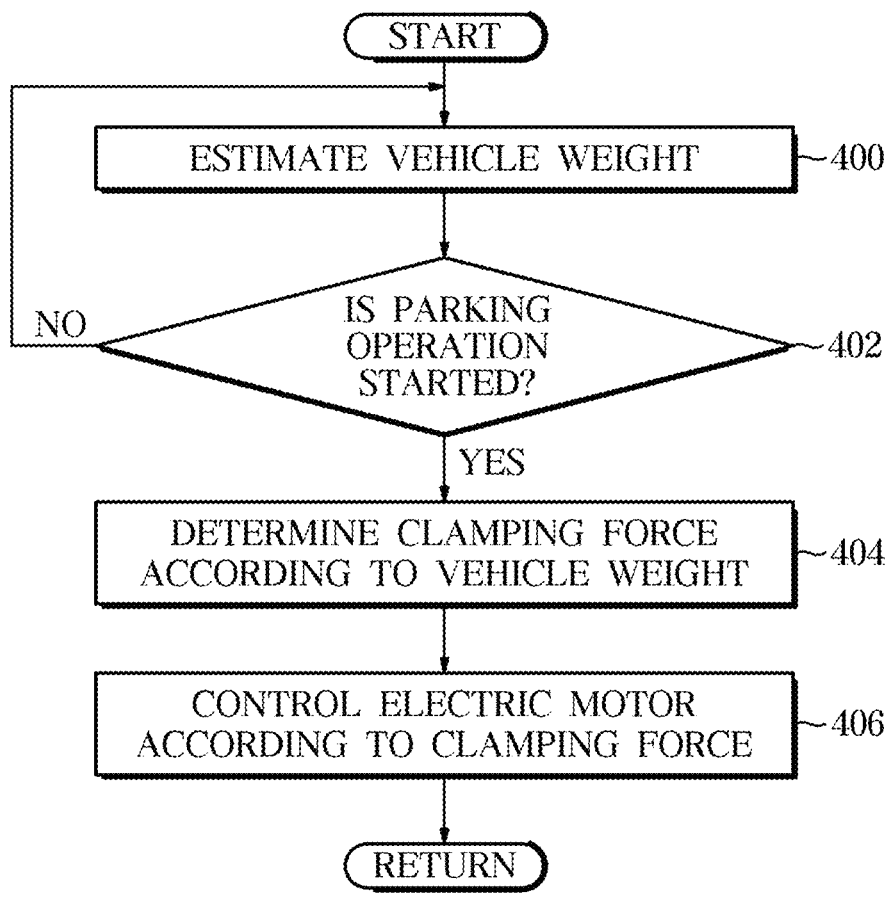

[FIG. 8]
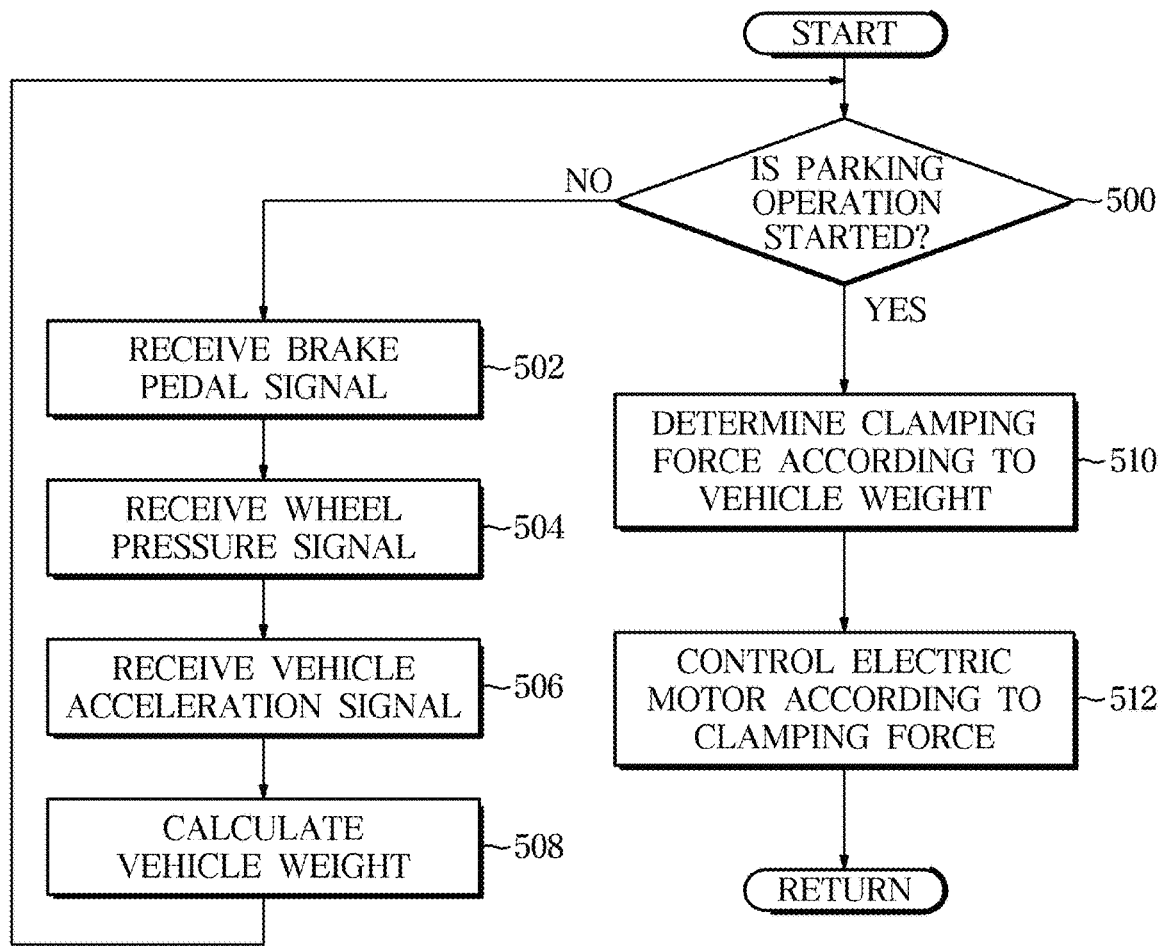

[FIG. 9]
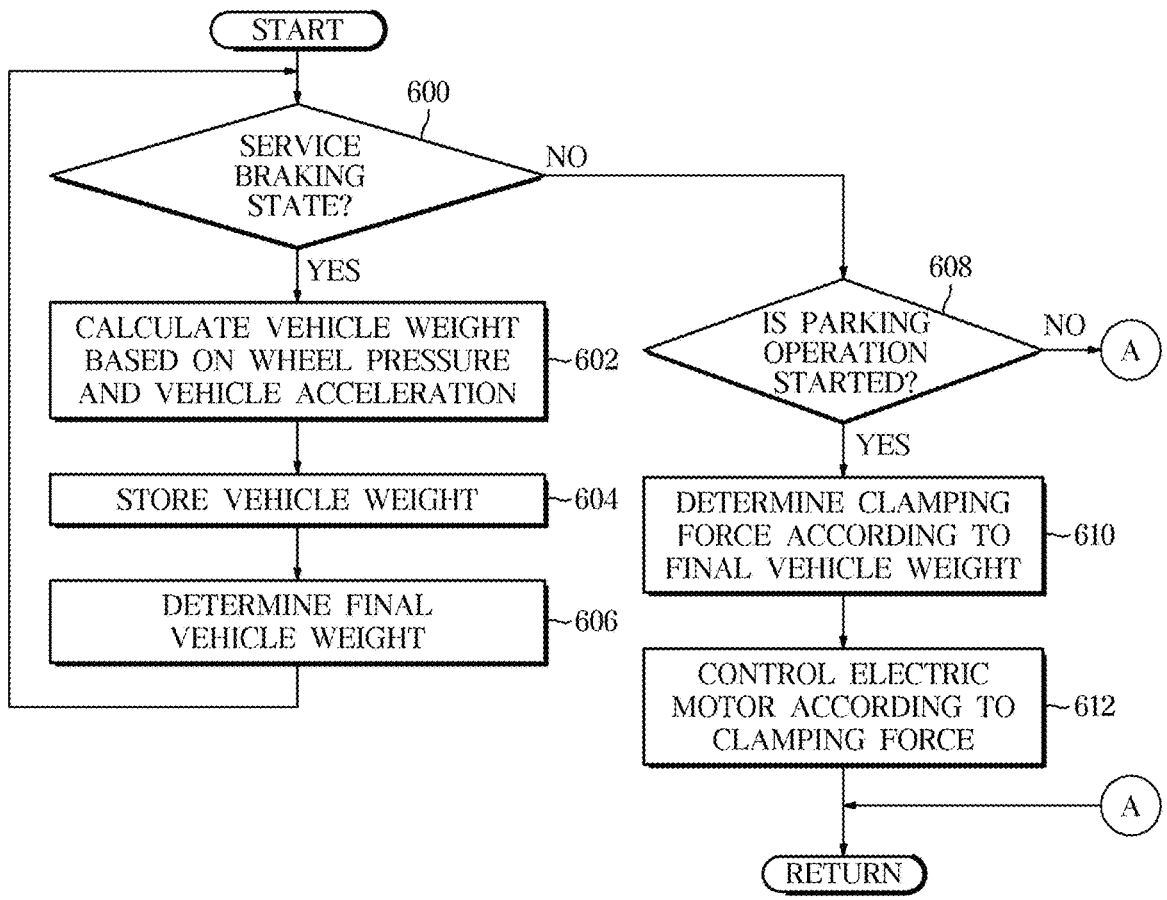

ELECTRONIC PARKING BRAKE SYSTEM AND CONTROL METHOD THEREFOR

CROSS-REFERENCE OF RELATED APPLICATIONS

This application is the U.S. National Phase under 35 U.S.C. § 371 of International Patent Application No. PCT/KR2020/017482, filed on Dec. 2, 2020, which claims the benefit of Korean Patent Application No. 10-2019-0166134, filed on Dec. 12, 2019, the entire disclosures of each are incorporated by reference herein.

TECHNICAL FIELD

The disclosure relates to a Motor-on-Caliper-type electronic parking brake system and a control method thereof that operates a motor integrated with a caliper mounted on a vehicle wheel.

BACKGROUND ART

In general, an electronic parking brake (EPB) system, in particular, a Motor-on-Caliper (MoC)-type EPB system increases a torque, generated from an electric motor, through a reducer to generate a clamping force required for parking by a mechanical system inside a caliper.

A MoC-type EPB system presses brake pads onto a disc, which rotates integrally with a vehicle wheel, by pressing a piston through an operation of an electric motor, thereby may generate a clamping force by a friction force between the brake pads and the disc.

In a conventional EPB system, a clamping force is controlled based on a maximum weight of a vehicle.

In actual driving conditions, however, driving or travelling with a maximum weight does not occur often. Accordingly, constituent components of a vehicle are inevitably overdesigned, causing the increase in manufacturing cost.

DISCLOSURE

Technical Problem

An aspect of the disclosure provides an electronic parking brake system and a control method thereof that may generate a clamping force required for parking by predicting an actual weight of a vehicle, while preventing an overdesign.

Technical Solution

According to an aspect of the disclosure, there is provided an electronic parking brake system including: an electronic parking brake provided to generate a clamping force on a wheel of a vehicle; and a controller configured to estimate a weight of the vehicle based on a wheel pressure and a longitudinal acceleration of the vehicle at a time of service braking during driving, determine a clamping force required for parking based on the estimated weight of the vehicle during a parking operation, and operate the electronic parking brake to generate the determined clamping force.

The controller is configured to determine the clamping force required for parking as a higher value, as the estimated weight of the vehicle is heavier.

The controller is configured to repeatedly estimate the weight of the vehicle based on the wheel pressure and the longitudinal acceleration of the vehicle until the parking operation is started from the time of service braking during driving, and estimate a highest value among the estimated weights of the vehicle as the weight of the vehicle.

The controller is configured to repeatedly estimate the weight of the vehicle based on the wheel pressure and the longitudinal acceleration of the vehicle until the parking operation is started from the time of service braking during driving, accumulate the estimated weights of the vehicle, and estimate an average value of the accumulated weights as the weight of the vehicle.

When releasing the parking operation after the parking operation, the controller is configured to estimate a weight, obtained by increasing or decreasing a preset value from the estimated weight of the vehicle, as the weight of the vehicle.

The electronic parking brake system includes a communication interface configured to communicate with a system mounted on the vehicle to receive the wheel pressure and the longitudinal acceleration of the vehicle, wherein the controller is configured to receive the wheel pressure and the longitudinal acceleration of the vehicle at the time of service braking during driving through the communication interface, and estimate the weight of the vehicle based on the received wheel pressure and longitudinal acceleration of the vehicle.

According to another aspect of the disclosure, there is provided an electronic parking brake system including a motor actuator operated by an electric motor, the electronic parking brake system including: a motor drive circuit configured to drive the electric motor; a current sensor configured to detect a current flowing through the electric motor; a communication interface configured to communicate with a system mounted on a vehicle to receive a wheel pressure and a longitudinal acceleration of the vehicle; and a controller configured to receive the wheel pressure and the longitudinal acceleration of the vehicle at a time of service braking during driving from the communication interface, estimate a weight of the vehicle based on the received wheel pressure and longitudinal acceleration of the vehicle, change a target current based on the estimated weight of the vehicle during a parking operation, and drive the electric motor through the motor drive circuit so that a motor current detected by the current sensor reaches the changed target current.

The controller is configured to change the target current to a higher value, as the estimated weight of the vehicle is heavier.

The controller is configured to determine a clamping force required for parking based on the estimated weight of the vehicle, and change the target current according to the determined clamping force.

The controller is configured to repeatedly estimate the weight of the vehicle based on the wheel pressure and the longitudinal acceleration of the vehicle until the parking operation is started from the time of service braking during driving, and estimate a highest value among the estimated weights of the vehicle as the weight of the vehicle.

According to still another aspect of the disclosure, there is provided a control method of an electronic parking brake system including an electronic parking brake provided to generate a clamping force on a wheel of a vehicle, the control method including: estimating a weight of the vehicle based on a wheel pressure and a longitudinal acceleration of the vehicle at a time of service braking during driving; determining a clamping force required for parking based on the estimated weight of the vehicle during a parking operation; and operating the electronic parking brake to generate the determined clamping force.

The estimating of the weight of the vehicle detects the wheel pressure and the longitudinal acceleration of the vehicle at the time of service braking during driving, and estimates the weight of the vehicle based on the detected wheel pressure and longitudinal acceleration of the vehicle.

The estimating of the weight of the vehicle receives the wheel pressure and the longitudinal acceleration of the vehicle at the time of service braking during driving through a communication interface, and estimates the weight of the vehicle based on the received wheel pressure and longitudinal acceleration of the vehicle.

The estimating of the weight of the vehicle repeatedly estimates the weight of the vehicle based on the wheel pressure and the longitudinal acceleration of the vehicle until the parking operation is started from the time of service braking during driving, and estimates a highest value among the estimated weights of the vehicle as the weight of the vehicle.

The determining of the clamping force determines the clamping force required for parking as a higher value, as the estimated weight of the vehicle is heavier.

Advantageous Effects

According to an aspect of the disclosure, a clamping force required for parking can be generated by predicting an actual weight of a vehicle, while preventing an overdesign.

DESCRIPTION OF DRAWINGS

FIG. 1 illustrates a vehicle to which an electronic parking brake system according to an embodiment is applied.

FIG. 2 illustrates a configuration of an electronic parking brake (EPB) applied to an EPB system according to an embodiment.

FIG. 3 illustrates a control block of an EPB system according to an embodiment.

FIG. 4 illustrates estimating a vehicle weight in an EPB system according to an embodiment.

FIG. 5 illustrates a result of estimating a vehicle weight at a time of service braking during driving in an EPB system according to an embodiment.

FIG. 6 illustrates a clamping force for each vehicle weight estimated in an EPB system according to an embodiment.

FIG. 7 illustrates a control method of an EPB system according to an embodiment.

FIG. 8 illustrates a control method of an EPB system according to another embodiment.

FIG. 9 illustrates a control method of an EPB system according to still another embodiment.

BEST MODE OF THE DISCLOSURE

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated elements, but do not preclude the presence or addition of one or more other elements.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 illustrates a vehicle to which an electronic parking brake system according to an embodiment is applied.

Referring to FIG. 1, a vehicle may include an electronic brake system 10, a driver assistance system 20 and an electronic parking brake system 30.

The electronic brake system 10 may control a brake apparatus in response to a driver's braking intention through a brake pedal and/or a wheel slip.

The electronic brake system 10 may be an anti-lock braking system (ABS) capable of temporarily releasing braking of vehicle wheels in response to a wheel slip detected when a vehicle is braked. Also, the electronic brake system 10 may be an electronic stability control (ESC) capable of selectively releasing braking of vehicle wheels in response to oversteering and/or understeering detected when a vehicle is steered. Also, the electronic brake system 10 may be a traction control system (TCS) capable of temporarily braking vehicle wheels in response to a wheel slip detected when a vehicle is driven.

When a pedestrian and/or an obstacle exists in a detection area depending on a gear state among a front detection area and a rear detection area of a vehicle when the vehicle is stopped and then departs, the driver assistance system 20 may determine whether emergency braking of the vehicle is required according to a driver's acceleration intention, and perform emergency braking of the vehicle or warn the driver according to a result of the determination. Specifically, when the pedestrian and/or the obstacle exists in the detection area, the driver assistance system 20 may recognize an accelerator pedal change amount from an accelerator pedal position detected through an accelerator pedal sensor, determine whether the emergency braking of the vehicle is required based on the recognized accelerator pedal change amount, and perform emergency braking of the vehicle, when required.

The driver assistance system 20 may be implemented as a forward collision avoidance (FCA), autonomous emergency braking (AEB), lane departure warning (LDW), lane keeping assist (LKA), smart parking assist system (SPAS), driver attention warning (DAW), smart cruise control (SCC), blind spot detection (BSD), and the like.

The electronic parking brake system 30 may communicate with the electronic brake system 10 and the driver assistance system 20 via a vehicle communication network (NT). For example, the systems may transmit/receive data through Ethernet, media oriented systems transport (MOST), FlexRay, controller area network (CAN), local interconnect network (LIN), and the like.

FIG. 2 illustrates a configuration of an electronic parking brake (EPB) applied to an EPB system according to an embodiment.

Referring to FIG. 2, an EPB 100 may include a carrier 110 on which a pair of pad plates 111 and 112 are installed movably in forward and backward direction to press a brake disc D that rotates with a wheel of a vehicle, a caliper housing 120 slidably installed on the carrier 110 and including a cylinder 123 in which a piston 121 is movably installed in forward and backward direction by braking hydraulic pressure, a power conversion unit 130 that presses the piston 121, and a motor actuator 140 that delivers a rotational force to the power conversion unit 130 using a motor M.

The pair of pad plates 111 and 112 are divided into an inner pad plate 111 disposed to be in contact with the piston 121 and an outer pad plate 112 disposed to be in contact with a finger part 122 of the caliper housing 120. The pair of pad plates 111 and 112 are installed on the carrier 110 fixed to a vehicle body so that the pair of pad plates 111 and 112 may move toward both sides of the brake disc D. Also, brake pads 113 are attached to one surface of each of the pair of pad plates 111 and 112 that face the brake disc D.

The caliper housing 120 is slidably installed on the carrier 110. More specifically, the power conversion unit 130 is installed at a rear of the caliper housing 120, and the caliper housing 120 includes the cylinder 123 in which the piston 121 is movably installed in forward and backward direction and the finger part 122 bent in a lower direction to operate the outer pad plate 112. The finger part 122 and the cylinder 123 are integrally formed.

The piston 121 is provided in a cylindrical shape to have an inner shape like a cup, and slidably inserted inside the cylinder 123. The piston 121 presses the inner pad plate 111 toward the brake disc D by an axial force of the power conversion unit 130 that receives the rotational force of a motor actuator 140. Accordingly, when the axial force of the power conversion unit 130 is applied, the piston 121 moves toward the inner pad plate 111, thereby pressing the inner pad plate 111. The caliper housing 120 operates in an opposite direction to the piston 121 by a reaction force, and thus the finger part 122 presses the outer pad plate 112 to the brake disc D side. Accordingly, braking may be performed.

The power conversion unit 130 may receive the rotational force from the motor actuator 140 and function to press the piston 121 to the inner pad plate 111 side.

The power conversion unit 130 may include a nut member 131, disposed inside the piston 121 to be in contact with the piston 121, and a spindle member 135 screwed to the nut member 131.

The nut member 131 is disposed inside the piston 121 in a state where rotation thereof is limited, and is screwed to the spindle member 135.

The nut member 131 may include a head portion 132 provided to be in contact with the piston 121, and an engagement portion 133 extending from the head portion 132 and in which a female screw thread is formed on an inner circumferential surface thereof in order to be screwed to the spindle member 135.

The nut member 131 moves forward or backward depending on a rotation direction of the spindle member 135, and may function to press the piston 121 or release the pressure on the piston 121. In this instance, the forward direction may be a movement direction in which the nut member 131 approaches the piston 121. The backward direction may be a movement direction in which the nut member 131 is away from the piston 121. In addition, the forward direction may be a movement direction in which the piston 121 approaches the brake pads 113. The backward direction may be a movement direction in which the piston 121 is away from the brake pads 113.

The spindle member 135 may include a shaft portion 136, which passes through a rear portion of the caliper housing 120 and rotates by receiving the rotational force of the motor actuator 140, and a flange portion 137 radially extending from the shaft portion 136. The shaft portion 136 may have one side which is rotatably installed and passes through a rear side of the cylinder 123, and the other side disposed inside the piston 121. In this instance, the one side of the shaft portion 136 that passes through the cylinder 123 is connected to an output shaft of a reducer 142 to receive the rotational force of the motor actuator 140.

The motor actuator 140 may include an electric motor 141 and the reducer 142.

The electric motor 141 moves the nut member 131 forward or backward by rotating the spindle member 135, thereby pressing the piston 121 or releasing the pressure on the piston 121.

The reducer 142 may be provided between an output side of the electric motor 141 and the spindle member 135.

Through the above configuration, in a parking apply mode, the EPB 100 may rotate the spindle member 135 in one direction using the motor actuator 140, thereby moving the nut member 131 and pressing the piston 121. The piston 121 pressed by the movement of the nut member 131 presses the inner pad plate 111, and thus the brake pads 113 come into close contact with the brake disc D, thereby may generate a clamping force.

Also, in a parking release mode, the EPB 100 may rotate the spindle member 135 in an opposite direction using the motor actuator 140, thereby moving the nut member 131 pressed by the piston 121 backward. The pressure on the piston 121 may be released by the backward movement of the nut member 131. Due to the release of the pressure on the piston 121, the brake pads 113 may be spaced apart from the brake disc D, thereby may release the generated clamping force.

FIG. 3 illustrates a control block of an EPB system according to an embodiment.

Referring to FIG. 3, the EPB system 30 may include a controller 200 that performs overall control related to an operation of the EPB 100.

An input side of the controller 200 is electrically connected to a current sensor 300.

An input output side of the controller 200 is electrically connected to a communication interface 310.

An output side of the controller 200 is electrically connected to a motor drive circuit 320.

The current sensor 300 may detect a current flowing through the electric motor 141. For example, the current sensor 300 may detect a motor current flowing through the electric motor 141 using shunt resistance or a hall sensor. In addition to the shunt resistance or hall sensor, various methods for detecting the motor current may be applied to the current sensor 300. The current sensor 300 may transmit information about the detected current to the controller 200.

The communication interface 310 may transmit and receive a communication signal with the electronic brake system 10 and the driver assistance system 20 through a vehicle communication network (NT). The communication interface 310 may include a CAN transceiver.

The motor drive circuit 320 may rotate the electric motor 141 in forward or reverse direction. For example, the motor drive circuit 320 may include an H-bridge circuit including a plurality of electric switching devices to rotate the electric motor 141 in forward or reverse direction. During a parking apply operation where the electric motor 141 rotates in one direction by the motor drive circuit 320, the rotation of the driver motor 141 in one direction is decelerated through the reducer 142, thereby may rotate the spindle member 135 in one direction with great force. When the spindle member 135 rotates in one direction, a shaft direction of the nut member 131 may be moved. When the nut member 131 presses the piston 121, two brake pads 113 press the brake disc D, and thus vehicle wheels may be braked. In a parking release operation, operations may be performed in an opposite manner to the parking apply operation.

The controller 200 may be referred to as an electronic control unit (ECU).

The controller 200 may include a processor 210 and a memory 220.

The memory 220 may store a program for processing or control of the processor 210 and various data for operating the electronic brake system.

The memory 220 may include a volatile memory such as a static random access memory (S-RAM) and dynamic random access memory (D-RAM), and a non-volatile memory such as a flash memory, a read only memory (ROM), an erasable programmable read only memory (EPROM), and the like.

The processor 210 may control overall operations of the EPB system 30.

The controller 200 described above may rotate the electric motor 141 in forward or reverse direction through the motor drive circuit 320.

The controller 200 may perform a parking apply mode or a parking release mode by an operation signal of a parking switch operated by a driver or an operation signal generated by a program related to an operation of the EPB.

In the parking apply mode, the controller 200 may rotate the electric motor 141 in one direction, thereby moving the nut member 131 forward and pressing the piston 121. Accordingly, a parking apply operation in which the brake pads 113 come into close contact with the brake disc D to generate a clamping force may be performed.

In the parking release mode, the controller 200 may rotate the electric motor 141 in an opposite direction to move the nut member 131 backward, thereby releasing the pressure on the piston 121. Accordingly, the controller 200 may perform a parking release operation for releasing the generated clamping force by separating the brake pads 113 from the brake disc D.

The controller 200 may request and receive information required for estimating a vehicle weight from the electronic brake system 10 and/or the driver assistance system 20 through the communication interface 310.

The controller 200 may request and receive a brake pedal signal, a brake pressure signal, and a vehicle acceleration signal from the electronic brake system 10 and/or the driver assistance system 20 through the communication interface 310.

The brake pedal signal may be a brake pedal signal output from a pedal displacement sensor installed in the electronic brake system 10 to detect an operation of a brake pedal. The brake pressure signal may be a pressure signal output from a brake pressure sensor installed in the electronic brake system 10 to detect a brake pressure. The brake pressure signal may be a wheel pressure signal output from a wheel pressure sensor for detecting a wheel pressure of a wheel on which the EPB 100 is installed. The vehicle acceleration signal may be an acceleration signal output from a longitudinal acceleration sensor installed in the driver assistance system 20 to detect a longitudinal acceleration of the vehicle. For reference, as long as a system is capable of providing the brake pedal signal, the brake pressure signal and the vehicle acceleration signal, the controller 200 may receive the above-described signals from the system instead of the electronic brake system 10 and the driver assistance system 20.

When the brake pedal signal is received, the controller 200 may request and receive the brake pressure signal and the vehicle acceleration signal from the electronic brake system 10.

FIG. 4 illustrates estimating a vehicle weight in an EPB system according to an embodiment.

Referring to FIG. 4, the controller 200 may estimate a weight of a vehicle based on a wheel pressure and a vehicle acceleration.

The controller 200 may estimate the weight of the vehicle based on the wheel pressure and the vehicle acceleration.

The controller 200 may estimate the weight of the vehicle based on the wheel pressure and the vehicle acceleration at a time of service braking during driving.

When a brake pedal is operated, the controller 200 may estimate the weight of the vehicle based on the wheel pressure and the vehicle acceleration.

By inversely calculating a pressure P that generates a braking force of the vehicle and using a relationship between the pressure P and a force where a piston of a caliper acts on brake pads when the pressure P acts on the caliper, a following relational expression for the weight W of the vehicle and the vehicle acceleration a may be derived.

$$P = Wa \times \frac{1}{A_{cylinder} \times N_{piston} \times BF \times \eta} \times \left(\frac{R_{eff}}{R_{tire}}\right) \quad \text{[Equation 1]}$$

[Equation 1] above may be rearranged and expressed as, $$W = \frac{P \times A_{cylinder} \times N_{piston} \times BF \times \eta}{a} \times \left(\frac{R_{tire}}{R_{eff}}\right) \quad \text{[Equation 2]}$$

Here, $A_{cylinder}$ denotes a cross-sectional area of the piston, $N_{piston}$ denotes the number of pistons, BF denotes a brake factor (in general, $2\mu_{pad}$; $\mu_{pad}$ is a brake pad friction coefficient), $\eta$ denotes an efficiency, $R_{tire}$ denotes a tire radius, and $R_{eff}$ denotes an effective disc radius.

FIG. 5 illustrates a result of estimating a vehicle weight at a time of service braking during driving in an EPB system according to an embodiment.

Referring to FIG. 5, a vertical axis represents an estimated vehicle weight and a horizontal axis represents an estimated number.

Until a parking operation is started, a vehicle weight may be repeatedly estimated and stored based on a wheel pressure and a vehicle acceleration each time a service braking is performed while driving.

A highest value among a plurality of estimated vehicle weights may be estimated as a final vehicle weight.

Also, the plurality of estimated vehicle weights may be accumulated and an average value of the accumulated values may be estimated as a final vehicle weight.

Meanwhile, when the parking operation is released after performing the parking operation, with reference to an already estimated vehicle weight, a value obtained by increasing or decreasing a preset value (Delta weight) from the already estimated vehicle weight may be estimated as a final vehicle weight, or a previously estimated vehicle weight may be reset to zero, and then a vehicle weight may be newly estimated again.

FIG. 6 illustrates a clamping force for each vehicle weight estimated in an EPB system according to an embodiment.

Referring to FIG. 6, a vertical axis represents an estimated vehicle weight and a horizontal axis represents a clamping force.

As the estimated vehicle weight increases, the clamping force may be increased.

A proper clamping force required for parking may be changed in a manner of changing a target current of the EPB system.

A proper clamping force according to a vehicle weight may be generated by reaching a current supplied to the electric motor 141 to the changed target current.

FIG. 7 illustrates a control method of an EPB system according to an embodiment.

Referring to FIG. 7, the controller 200 may estimate a vehicle weight (400).

The controller 200 may determine whether a parking operation is started (402). In this instance, when a parking switch is turned on, the controller 200 may determine that the parking operation is started.

As a result of determination in operation 402, when it is determined that the parking operation is not started, the controller 200 may return to operation 400 and perform a following operation.

Meanwhile, as a result of determination in operation 402, when it is determined that the parking operation is started, the controller 200 may determine a clamping force according to the vehicle weight (404).

The controller 200 may control the electric motor 141 according to the determined clamping force to generate the determined clamping force (406).

As such, even though driving or travelling with a maximum weight does not occur often, because a weight state of a vehicle may not be identified in a conventional art, a clamping force for parking operation is set based on the maximum weight of the vehicle. Accordingly, constituent components of the vehicle are inevitably overdesigned, causing the increase in manufacturing cost.

According to an embodiment, however, the EPB system may change the clamping force required for parking, by predicting the vehicle weight based on a wheel pressure and a vehicle acceleration at a time of service braking during driving, thereby may flexibly control the clamping force for each vehicle weight state. Accordingly, the clamping force required for parking may be generated by predicting an actual vehicle weight, while preventing overdesign.

FIG. 8 illustrates a control method of an EPB system according to another embodiment.

Referring to FIG. 8, the controller 200 may determine whether a parking operation is started (500).

As a result of determination in operation 500, when it is determined that the parking operation is not started, the controller 200 may receive a brake pedal signal (502), receive a wheel pressure signal (504), and receive a vehicle acceleration signal (506) from another system in a vehicle through the communication interface 310.

When a brake pedal is operating, the controller 200 may calculate a vehicle weight based on a wheel pressure and a vehicle acceleration (508).

Meanwhile, as a result of determination in operation 500, when it is determined that the parking operation is started, the controller 200 may determine a clamping force according to the vehicle weight (510).

The controller 200 may control the electric motor 141 according to the determined clamping force to generate the determined clamping force (512).

FIG. 9 illustrates a control method of an EPB system according to still another embodiment.

Referring to FIG. 9, the controller 200 may determine whether a vehicle is in a service braking state during driving (600).

As a result of determination in operation 600, when it is determined that the vehicle is in the service braking state, the controller 200 may calculate a vehicle weight based on a wheel pressure and a vehicle acceleration detected or received from another system (602).

The controller 200 may store the calculated vehicle weight in the memory 220 in the vehicle (604).

The controller 200 may determine a final vehicle weight among the vehicle weights stored in the memory 220 (606). A highest value among the stored vehicle weights may be determined as the final vehicle weight.

Meanwhile, as a result of determination in operation 600, when it is determined that the vehicle is not in the service braking state during driving, the controller 200 may determine whether a parking operation is started (608).

As a result of determination in operation 608, when it is determined that the parking operation is started, the controller 200 may determine a clamping force according to the final vehicle weight (610).

The controller 200 may control the electric motor 141 according to the determined clamping force to generate the determined clamping force (612).

As described above, the disclosure may generate a clamping force required for parking, by predicting an actual vehicle weight, while preventing overdesign.

The invention claimed is:

1. An electronic parking brake system, comprising:
   an electronic parking brake provided to generate a clamping force on a wheel of a vehicle; and
   a controller configured to estimate a weight of the vehicle based on a wheel pressure and a longitudinal acceleration of the vehicle until a parking operation is started from a time of service braking during driving, determine a clamping force required for parking based on the estimated weight of the vehicle during the parking operation, and operate the electronic parking brake to generate the determined clamping force.

2. The electronic parking brake system of claim 1, wherein the controller is configured to determine the clamping force required for parking as a higher value, as the estimated weight of the vehicle is heavier.

3. The electronic parking brake system of claim 1, wherein the controller is configured to repeatedly estimate the weight of the vehicle based on the wheel pressure and the longitudinal acceleration of the vehicle until the parking operation is started from the time of service braking during driving, and estimate a highest value among the estimated weights of the vehicle as the weight of the vehicle.

4. The electronic parking brake system of claim 1, wherein the controller is configured to repeatedly estimate the weight of the vehicle based on the wheel pressure and the longitudinal acceleration of the vehicle until the parking operation is started from the time of service braking during driving, accumulate the estimated weights of the vehicle, and estimate an average value of the accumulated weights as the weight of the vehicle.

5. The electronic parking brake system of claim 1, wherein, when releasing the parking operation after the parking operation, the controller is configured to estimate a weight, obtained by increasing or decreasing a preset value from the estimated weight of the vehicle, as the weight of the vehicle.

6. The electronic parking brake system of claim 1, comprising:
a communication interface configured to communicate with a system mounted on the vehicle to receive the wheel pressure and the longitudinal acceleration of the vehicle,
wherein the controller is configured to receive the wheel pressure and the longitudinal acceleration of the vehicle at the time of service braking during driving through the communication interface, and estimate the weight of the vehicle based on the received wheel pressure and longitudinal acceleration of the vehicle.

7. An electronic parking brake system comprising a motor actuator operated by an electric motor, the electronic parking brake system comprising:
a motor drive circuit configured to drive the electric motor;
a current sensor configured to detect a current flowing through the electric motor;
a communication interface configured to communicate with a system mounted on a vehicle to receive a wheel pressure and a longitudinal acceleration of the vehicle; and
a controller configured to receive the wheel pressure and the longitudinal acceleration of the vehicle until a parking operation is started from a time of service braking during driving from the communication interface, estimate a weight of the vehicle based on the received wheel pressure and longitudinal acceleration of the vehicle, change a target current based on the estimated weight of the vehicle during the parking operation, and drive the electric motor through the motor drive circuit so that a motor current detected by the current sensor reaches the changed target current.

8. The electronic parking brake system of claim 7, wherein the controller is configured to change the target current to a higher value, as the estimated weight of the vehicle is heavier.

9. The electronic parking brake system of claim 7, wherein the controller is configured to determine a clamping force required for parking based on the estimated weight of the vehicle, and change the target current according to the determined clamping force.

10. The electronic parking brake system of claim 7, wherein the controller is configured to repeatedly estimate the weight of the vehicle based on the wheel pressure and the longitudinal acceleration of the vehicle until the parking operation is started from the time of service braking during driving, and estimate a highest value among the estimated weights of the vehicle as the weight of the vehicle.

11. A control method of an electronic parking brake system comprising an electronic parking brake provided to generate a clamping force on a wheel of a vehicle, the control method comprising:
estimating a weight of the vehicle based on a wheel pressure and a longitudinal acceleration of the vehicle until a parking operation is started from a time of service braking during driving;
determining a clamping force required for parking based on the estimated weight of the vehicle during the parking operation; and
operating the electronic parking brake to generate the determined clamping force.

12. The control method of claim 11, wherein the estimating of the weight of the vehicle detects the wheel pressure and the longitudinal acceleration of the vehicle until a parking operation is started from the time of service braking during driving, and estimates the weight of the vehicle based on the detected wheel pressure and longitudinal acceleration of the vehicle.

13. The control method of claim 11, wherein the estimating of the weight of the vehicle receives the wheel pressure and the longitudinal acceleration of the vehicle until a parking operation is started from the time of service braking during driving through a communication interface, and estimates the weight of the vehicle based on the received wheel pressure and longitudinal acceleration of the vehicle.

14. The control method of claim 11, wherein the estimating of the weight of the vehicle repeatedly estimates the weight of the vehicle based on the wheel pressure and the longitudinal acceleration of the vehicle until the parking operation is started from the time of service braking during driving, and estimates a highest value among the estimated weights of the vehicle as the weight of the vehicle.

15. The control method of claim 11, wherein the determining of the clamping force determines the clamping force required for parking as a higher value, as the estimated weight of the vehicle is heavier.

* * * * *